Feb. 27, 1951     E. J. JOHANSSON     2,543,290
CHUCK
Original Filed June 13, 1945
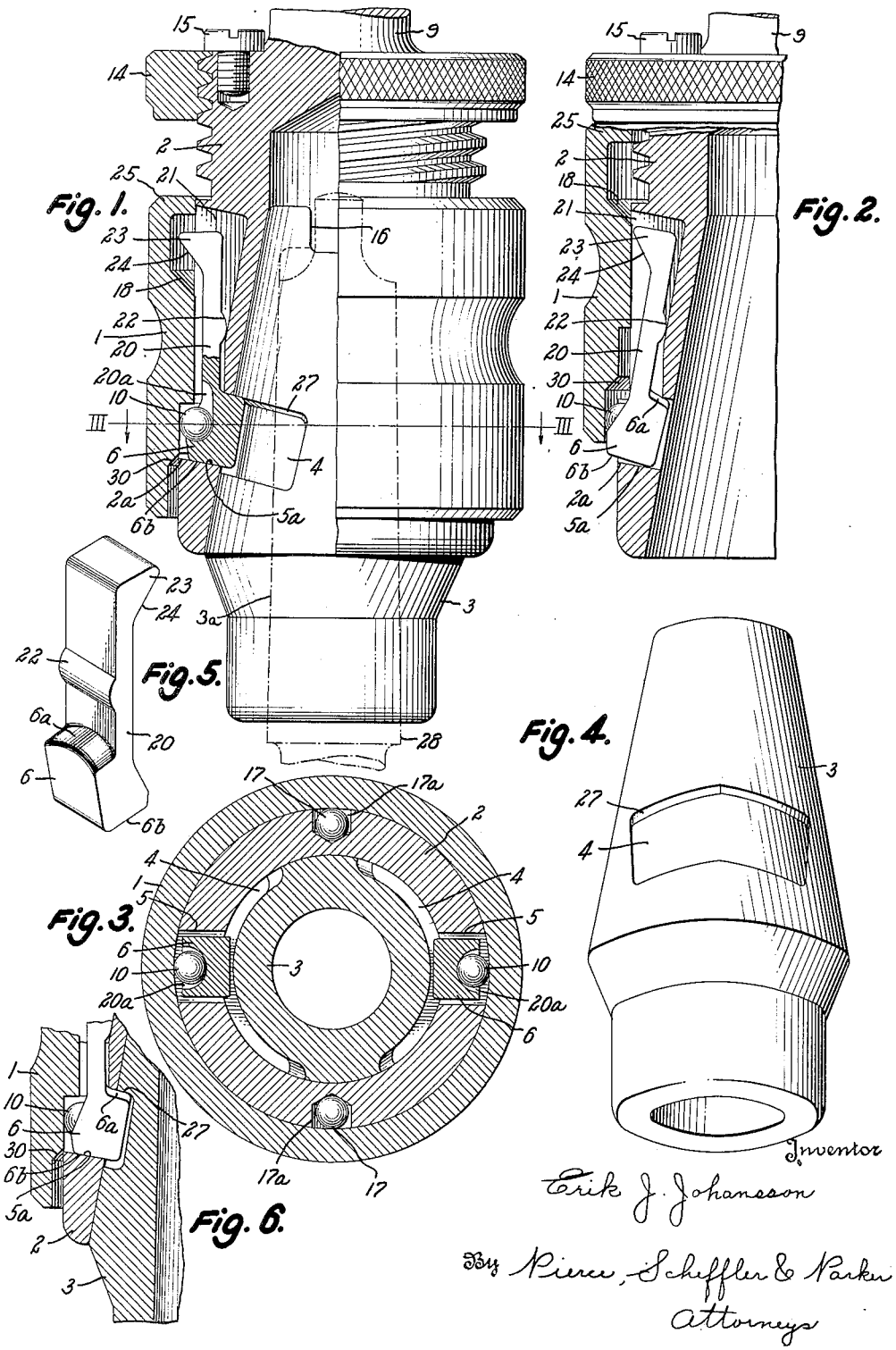
Inventor
Erik J. Johansson
By Pierce, Scheffler & Parker
Attorneys Patented Feb. 27, 1951

2,543,290

UNITED STATES PATENT OFFICE 2,543,290

CHUCK

Erik Johannes Johansson, Bengtsbo,
Brickegarden, Kariskoga, Sweden

Original application June 13, 1945, Serial No. 599,190. Divided and this application February 14, 1949, Serial No. 76,248. In Sweden October 21, 1943

5 Claims. (Cl. 279—75)

This invention relates to improvements in chucks primarily intended for use as tool holding chucks in machine tools such as turning or drilling machines etc. in the operation of which the tool or the work piece rotate, and is a division of my copending application, Serial No. 599,190, filed June 13, 1945, now Patent No. 2,466,315. It is an object of the invention to provide improved means enabling an operator to safely, readily and rapidly replace the tool manually without stopping the rotating driving spindle and irrespective of its rotary direction.

Another object of the invention consists in the provision of improved means for latching the tool to the chuck without risk of damaging the interlocking means even though they are adapted to latch in opposite rotary directions and even though the disengagement and reengagement will take place forcibly on rotating the chuck or the work piece in engagement with the tool.

Still another object of the invention consists in the provision of means for positively disengaging the tool latching means to facilitate and accelerate or rather enable the withdrawal of the tool from the chuck even though the tool latching means interlock forcibly on a wedging fit less than the angle of friction.

Still another object of the invention consists in the provision of a chuck having latch members adapted to engage interlocking abutments on a tool or tool carrier without jumping and without being damaged or damaging said abutments when forcibly contacting said abutments by rapid relative rotary motion of said latch members and said tool or tool carrier, respectively.

With these and other objects, not specifically mentioned in view the invention consists in certain constructions and combinations hereinafter fully described and then specifically set forth in the claims hereunto appended.

In the accompanying drawings which form a part of this specification, and in which like characters of reference indicate the same or equivalent parts:

Fig. 1 is a vertical view of the improved chuck in latched driving position to the tool holder with the half to the left of the center line shown in section and the half to the right of the center line shown in elevation;

Fig 2 is also a vertical view similar to the left half of Fig. 1 but with the operating components of the chuck illustrated in the positions occupied when released from the tool holder;

Fig. 3 is a transverse section taken on line III—III of Fig. 1;

Fig. 4 is a perspective view of the tool holder showing the double inclined latching recess;

Fig. 5 is a perspective view of one of the two latching levers; and

Fig. 6 is a fragmentary vertical view similar to Fig. 1 but showing the parts engaged in elevation rather than in section.

Referring now to the drawings, the chuck has a taper bored core 2, the shank 9 of which is adapted to be inserted into the rotary driving spindle of a machine tool, not illustrated. The shank 9 may be of any shape suitable for the machine for which the chuck is adapted. A slidable locking sleeve 1 is slipped on the core 2 into the taper bore of which is inserted a cone 3 fitting tightly therein and carrying the tool 28.

A pair of lugs 6, constituting the latching members of the chuck, project inwardly from the lower ends of two oppositely disposed rocking levers 20 that are loosely inserted into longitudinal grooves 21 in the core 2. Only one of the levers 20 is shown in Fig. 1 of the drawings but it will be apparent from Fig. 3 that the other is located 180° away from the one shown and hence is hidden from view beneath the locking sleeve 1.

Each lever is supported by the core 2 radially by means of a rounded shoulder 22 and axially by its latch lug 6 projecting into apertures in the core. At its upper end, each rocking lever 20 has an outwardly projecting nose 23 the lower surface 24 of which is bevelled. The sleeve 1 has interiorly a correspondingly bevelled annular surface 18 and at its upper end it has an inwardly extending flange 25 which protects the levers 20 and the grooves 21 from entrance of borings, etc.

The sleeve 1 has interiorly at its bottom end a conical surface 30 engaging balls 10 which are loosely inserted into recesses 20a in the levers 20 behind the latch lugs 6 so as to force the lugs 6 into the grooves 4 of the cone when sliding downwards. The balls 10 serve to decrease the friction between sleeve 1 and the latch lugs 6 so that the inner surface of the sleeve can be cylindrical or substantially cylindrical. e. g. provided with the narrow conical surface 30 having a wide angle of taper for rapidly forcing the lugs 6 into the grooves 4 described below. Sleeve 1 enclosing the levers 20 is supported radially by the balls 10 as well as by still another pair of balls 17 loosely inserted in recesses 17a in the periphery of core 2 spaced 90° from the balls 10.

As shown in Figs. 3 and 4, the cone 3 is exteriorly provided with two oppositely disposed ⋀ shaped latch grooves 4 having a downwardly facing upper shoulder 27 which extends downwardly in two symmetrically disposed sections, one section being a right-handed spiral and the other being a left-handed spiral. These spiral surfaces are bevelled at such an angle, as viewed in a radial plane such as illustrated in Fig. 6 that the bevelled surface 27 is parallel to a confronting complementary bevel 6a provided on the latch lug 6. The bevel surface 6a, which also slopes downwardly to each side from the center as shown in Fig. 5 to prevent the side edges of the latch 6 from biting into the bevelled surface 27, establishes a line contact engagement between the bevelled surfaces 6a, 27 as distinguished from the far less satisfactory point contact engagement obtained when conventional latch elements of the steel ball type are used. The expression "downwardly facing shoulder" as used in connection with the description of grooves 4 is chosen because the chuck is shown as operative in a vertical position but the invention is of course equally applicable to the same chuck should it be arranged to operate in a horizontal position.

If the machine spindle is horizontal or if the weight of the sleeve I is not sufficient to force by wedging-contact the latch members 6 into the grooves 4 and hold them in locking position, the chuck can be provided with a nut lock 14 threaded onto the core body 2 and being adapted to be run down to press against the upper end face of sleeve I thus moving the latter downward into locking position. Downward movement of sleeve I is limited by an enlarged portion 2a of the core 2 and the corresponding interior annular taper 30 in the sleeve. Return upward movement of the lock nut 14 to release the sleeve is limited by stop bolt 15 threaded into core 2, the head of the bolt extending laterally into the path of the lock nut as shown in Fig. 1.

Operation of the chuck is as follows:

Let it be assumed that the chuck parts are in the positions shown in Fig. 1 and that the sleeve I is of sufficient mass to hold the tool 28 firmly locked without the need for running down the lock nut 14. To replace the tool, sleeve I is raised manually by the operator to position shown in Fig. 2. As the sleeve rises, the interior, tapered shoulder 18 on the same rides against the complementary tapered toe portions 24 at the upper end of levers 20 thus rocking the upper ends of the levers inwardly about the fulcrum point 22 and simultaneously moving the lugs 6 out of the grooves 4 to release the cone 3 which together with the tool 28 wedged firmly therein will now drop into the operator's hand. By thus providing for positive retraction of the lugs 6 from grooves 4, the pitch angle of the grooves 4 as well as the wedge angles at the wedging line contact between lugs 6 and shoulders 27 may be less than the angle of friction.

For reinserting a tool together with its cone 3, sleeve I having dropped into its locking position is raised again and the cone 3 is inserted into the core 2 whereby the latch lugs 6 will be initially forced outwardly by the cone. Thereafter sleeve I is dropped so that its inner tapered surface 30 engages balls 10 and hence moves the latter and lugs 6 against the surface of the cone. Thereafter on rotary motion of the chuck or the work piece, the core 2 and cone 3 are relatively rotated to an extent defined by the initial play between the upper ends 6a of latch lugs 6 and the upper spiral walls 27 of grooves 4 as well the play between core 2 and cone 3 so that the lug surfaces 6a will ride on the spiral groove walls 27 until cone 3 has been firmly pressed into the bore of core 2 whereafter the lugs 6 will function not only as latch members but also as drivers.

Because the latching and driving forces between the core and cone are established by a line contact engagement between the tapered surfaces 6a and 27, a most firm interlocking is afforded without risk of damage or wear of the latch lugs 6 and their seats. Furthermore, the pressure seats at the opposite ends of latch lugs 6 are so located that the resultant of the compression stress to which each lug is subjected passes through those seats, i. e., the lower plane surface 6b of each lug is held firmly against the complementary lower plane surface 5a of the aperture 5 in core 2 by a pressure which has a component parallel to the chuck axis that is substantially greater than the component transverse to such axis. The pressures are accordingly exerted approximately parallel to the axes of the lugs 6, thereby developing frictional resistance to sliding movement of the lugs outwardly into inoperative position which offsets any tendency towards a release of the lugs by radial components of the pressure applied to the lugs. This is of very great importance if the interlocking is effected forcibly by rotary movement of the machine spindle or the work piece, and in consideration of the fact that the chuck is arranged for rotary movement in either direction, in which case it may happen that the lugs 6 enter any one of the relatively steep grooves 4 when the machine spindle revolves at full speed and the tool is retained by the work piece.

Finally, it will be observed that the tapered bore 3a in cone 3 terminates in a slot 16 of such configuration and dimensions that the end face of the shank of tool 28 will when the latter is fully jammed into the cone project at least into the slot and is therefore accessible for hammering upon to disengage the tool from the cone after the cone is removed from the core 2. Such arrangement affords a very steady and compact construction inasmuch as the tool 28 can be introduced further into the cone 3 than would be the case when using ordinary cones having grooves (with bottom) for the chisel of the tool shank.

In conclusion, it will be understood that while I have described and illustrated a preferred construction by which the novel inventive principles may be practised, various modifications in the construction and arrangement of parts may be resorted to by those skilled in the art without, however, departing from the spirit and scope of the invention as defined in the appended claims. Furthermore, while the illustrated chuck incorporates a ∧ groove 4 in the cone rendering the chuck self-engaging for both right and left hand rotation of the tool, one half ∕ or the other half ∖ of the groove can be deleted if the tool is to be rotated in one direction only.

I claim:

1. A self-engaging chuck comprising an internally tapered core having a substantially transverse aperture in the wall thereof, a complementary externally tapered cone seated in said core and detachable therefrom, said cone having a groove in its tapered surface which includes a downwardly facing spiral shoulder, a rocking lever including a latch lug adapted for sliding movement in said aperture, and a locking sleeve surrounding said lever and core and slidable on the latter, said sleeve including an internal surface adapted upon downward movement thereof to impart a rocking motion to said lever in such direction as to force said lug into said groove below said shoulder to thereby cause said lug to wedge between said shoulder and the lower surface of said aperture upon relative rotation of said core and cone, the cooperating contacting surfaces of said lug and shoulder being conical and inclined to the axis of said core to establish in said lug a compression stress having a resultant passing through the lower and contacting surfaces of said lug and aperture, the axial component of said resultant being substantially greater than the complementary radial component.

2. A self-engaging chuck comprising an internally tapered core having a substantially transverse aperture in the wall thereof, a complementary externally tapered cone seated in said core and detachable therefrom, said cone having a groove in its tapered surface which includes a downwardly facing spiral shoulder, a rocking lever including a latch lug adapted for sliding movement in said aperture, and a locking sleeve surrounding said lever and core and slidable on the latter, said sleeve including an internal tapered surface cooperative with an anti-friction member seated in said lever and adapted upon downward movement of said sleeve to impart a rocking motion to said lever in such direction as to force said lug into said groove below said shoulder to thereby cause said lug to wedge between said shoulder and the lower surface of said aperture upon relative rotation of said core and cone, the cooperating contacting surfaces of said lug and shoulder being conical and inclined to the axis of said core to establish in said lug a compression stress having a resultant passing through the lower and contacting surfaces of said lug and aperture, the axial component of said resultant being substantially greater than the complementary radial component.

3. A self-engaging chuck comprising an internally tapered core having an external longitudinal recess in the wall thereof communicating with a substantially transverse aperture through said wall, a complementary externally tapered cone seated in said core and detachable therefrom, said cone having a groove in its tapered surface which includes a downwardly facing spiral shoulder, a rocking lever positioned in said recess and which includes a latch lug adapted for sliding movement in said aperture, and a locking sleeve surrounding said lever and core and slidable on the latter, said sleeve including an internal surface adapted upon downward movement thereof to impart a rocking motion to said lever in such direction as to force said lug into said groove below said shoulder to thereby cause said lug to wedge between said shoulder and the lower surface of said aperture upon relative rotation of said core and cone, the cooperating contacting surfaces of said lug and shoulder being conical and inclined to the axis of said core to establish in said lug a compression stress having a resultant passing through the lower and contacting surfaces of said lug and aperture, the axial component of said resultant being substantially greater than the complementary radial component.

4. A self-engaging chuck comprising an internally tapered core having an exterior longitudinal recess in the wall thereof communicating with a substantially transverse aperture through said wall, a complementary externally tapered cone seated in said core and detachable therefrom, said cone having a groove in its tapered surface which includes a downwardly facing spiral shoulder, a rocking lever positioned in said groove, said lever including an abutment thereon located to one side of the fulcrum point and a latch lug located thereon to the other side of said fulcrum point and which is adapted for sliding movement in said aperture, and a locking sleeve surrounding said lever and core and slidable on the latter, said sleeve including one internal surface portion adapted upon downward movement thereof to impart a rocking motion to said lever in such direction as to force said lug into said groove below said shoulder to thereby cause the lug to wedge between said shoulder and the lower surface of said aperture upon relative rotation of said core and cone, the cooperating contacting surfaces of said lug and shoulder being conical and inclined to the axis of said core to establish in said lug a compression stress having a resultant passing through the lower and contacting surfaces of said lug and aperture, the axial component of said resultant being substantially greater than the complementary radial component, and said sleeve including another internal surface portion thereon adapted upon reverse upward movement thereof to engage the said abutment on said lever to rock the latter in such direction as to retract said lug from said groove.

5. A self-engaging chuck comprising an internally tapered core having a substantially transverse aperture in the wall thereof, a complementary externally tapered cone seated in said core and detachable therefrom, said cone having a groove in its tapered surface which includes downwardly facing spiral left-hand and right-hand shoulders, a rocking lever including a latch lug adapted for sliding movement in said aperture, and a locking sleeve surrounding said lever and core and slidable on the latter, said sleeve including an internal surface adapted upon downward movement thereof to impart a rocking motion to said lever in such direction as to force said lug into said groove below one or the other of said shoulders according to the direction of relative rotary motion of said core and cone to thereby cause said lug to wedge between said shoulder and the lower surface of said aperture, the cooperating contacting surfaces of said lug and shoulder being conical and inclined to the axis of said core to establish in said lug a compression stress having a resultant passing through the lower and contacting surfaces of said lug and aperture, the axial component of said resultant being substantially greater than the radial component.

ERIK JOHANNES JOHANSSON.

REFERENCES CITED

The following references are of record in the file of this patent:

UNITED STATES PATENTS

| Number | Name | Date |
| --- | --- | --- |
| 1,124,981 | Weaver | Jan. 12, 1915 |
| 1,252,253 | Dufresne | Jan. 1, 1918 |
| 1,686,601 | Currier | Oct. 9, 1928 |
| 1,781,442 | Currier | Nov. 11, 1930 |